(12) United States Patent
Benco et al.

(10) Patent No.: US 8,098,592 B2
(45) Date of Patent: Jan. 17, 2012

(54) CELLULAR DATA TRANSMISSION TIME PERIOD ESTIMATION

(75) Inventors: David S. Benco, Winfield, IL (US);
Kevin J. Overend, Elmhurst, IL (US);
Baoling S. Sheen, Naperville, IL (US);
Sandra L. True, St. Charles, IL (US);
Kenneth J. Voight, Sugar Grove, IL (US)

(73) Assignee: Alcatel Lucent, Paris (FR)

( * ) Notice: Subject to any disclaimer, the term of this patent is extended or adjusted under 35 U.S.C. 154(b) by 981 days.

(21) Appl. No.: 10/818,102

(22) Filed: Apr. 5, 2004

(65) Prior Publication Data

US 2005/0220012 A1    Oct. 6, 2005

(51) Int. Cl.
*H04L 12/26* (2006.01)
*H04B 17/00* (2006.01)
(52) U.S. Cl. .................... 370/254; 717/178; 455/67.7
(58) Field of Classification Search .................. 370/328
See application file for complete search history.

(56) References Cited

U.S. PATENT DOCUMENTS

| | | | |
|---|---|---|---|
| 5,797,010 A * | 8/1998 | Brown ........................... | 717/178 |
| 6,377,539 B1 * | 4/2002 | Kang et al. ..................... | 370/209 |
| 6,781,969 B2 * | 8/2004 | Nikides et al. ................. | 370/318 |
| 6,947,750 B2 * | 9/2005 | Kakani et al. ............... | 455/452.2 |
| 6,956,833 B1 * | 10/2005 | Yukie et al. .................... | 370/328 |
| 7,027,460 B2 * | 4/2006 | Iyer et al. ....................... | 370/429 |
| 7,075,913 B1 * | 7/2006 | Yavuz et al. ................... | 370/335 |
| 7,103,644 B1 * | 9/2006 | Zhang et al. ................... | 709/219 |
| 7,133,486 B2 * | 11/2006 | Zhang et al. ................... | 375/377 |
| 7,171,479 B2 * | 1/2007 | Buchanan et al. ............. | 709/228 |
| 7,180,871 B1 * | 2/2007 | Khaflzov et al. .............. | 370/252 |
| 7,224,677 B2 * | 5/2007 | Krishnamurthi et al. ...... | 370/331 |
| 7,260,060 B1 * | 8/2007 | Abaye et al. ................... | 370/230 |
| 7,299,064 B1 * | 11/2007 | Paranchych et al. .......... | 455/522 |
| 7,555,559 B2 * | 6/2009 | Chapweske .................... | 709/232 |
| 2002/0093923 A1 * | 7/2002 | Bouet ............................ | 370/328 |
| 2002/0162099 A1 * | 10/2002 | Lee et al. ....................... | 717/173 |
| 2002/0194325 A1 * | 12/2002 | Chmaytelli et al. ........... | 709/224 |
| 2003/0212992 A1 * | 11/2003 | Ronning et al. ............... | 717/178 |
| 2003/0236874 A1 * | 12/2003 | Hotti .............................. | 709/224 |
| 2005/0025076 A1 * | 2/2005 | Chaudhuri et al. ............ | 370/310 |
| 2006/0130053 A1 * | 6/2006 | Buljore et al. ................. | 717/173 |

OTHER PUBLICATIONS

Will 3G Really be the Next Big Wireless Technology, by Lee Garber, Technology News, Jan. 2002.*

* cited by examiner

*Primary Examiner* — Gregory Sefcheck
(74) *Attorney, Agent, or Firm* — Carmen Patti Law Group, LLC

(57) ABSTRACT

A method comprises the step of estimating a time period that remains for a cellular mobile communication device data transmission based on one or more determinations of status for one or more network resources that handle the cellular mobile communication device data transmission.

13 Claims, 2 Drawing Sheets

US 8,098,592 B2

CELLULAR DATA TRANSMISSION TIME PERIOD ESTIMATION

TECHNICAL FIELD

The invention relates generally to mobile communications and more particularly to mobile data transmissions.

BACKGROUND

Mobile phones employ packet data services of a cellular network to for data transmissions. In cellular networks, network resources for handling data transmissions are dynamically allocated. A data transmission is often broken up into a plurality of sub-sessions. The network resources allocated for the plurality of sub-sessions may be different due to varying resource constraints, subscriber load, and signal strength to the mobile phone. Unlike the Internet or other public or private packet data networks, there is no linear correlation between a transmission size of the data transmission and an amount of time that remains to complete a data transmission. An estimation of the time period that remains for a cellular data transmission is often inaccurate due to the varying resource constraints, subscriber load, and signal strength to the mobile phone.

Thus, a need exists for an increase in accuracy of an estimation of a time period that remains for a cellular data transmission.

SUMMARY

In one embodiment, there is provided there is provided a method for estimating a time period that remains for a cellular mobile communication device data transmission based on one or more determinations of status for one or more network resources that handle the cellular mobile communication device data transmission.

In another embodiment, there is provided an apparatus comprising a mobile switching center that makes one or more determinations of status for one or more network resources that handle a cellular mobile communication device data transmission. The mobile switching center estimates a time period that remains for the cellular mobile communication device data transmission based on the one or more determinations of status for the one or more network resources that handle the cellular mobile communication device data transmission.

In yet another embodiment, there is provided an article comprising one or more computer-readable signal-bearing media. The article includes means in the one or more media for estimating a time period that remains for a cellular mobile communication device data transmission based on one or more determinations of status for one or more network resources that handle the cellular mobile communication device data transmission.

DESCRIPTION OF THE DRAWINGS

Features of exemplary implementations of the invention will become apparent from the description, the claims, and the accompanying drawings in which:

DETAILED DESCRIPTION

Figure 1:
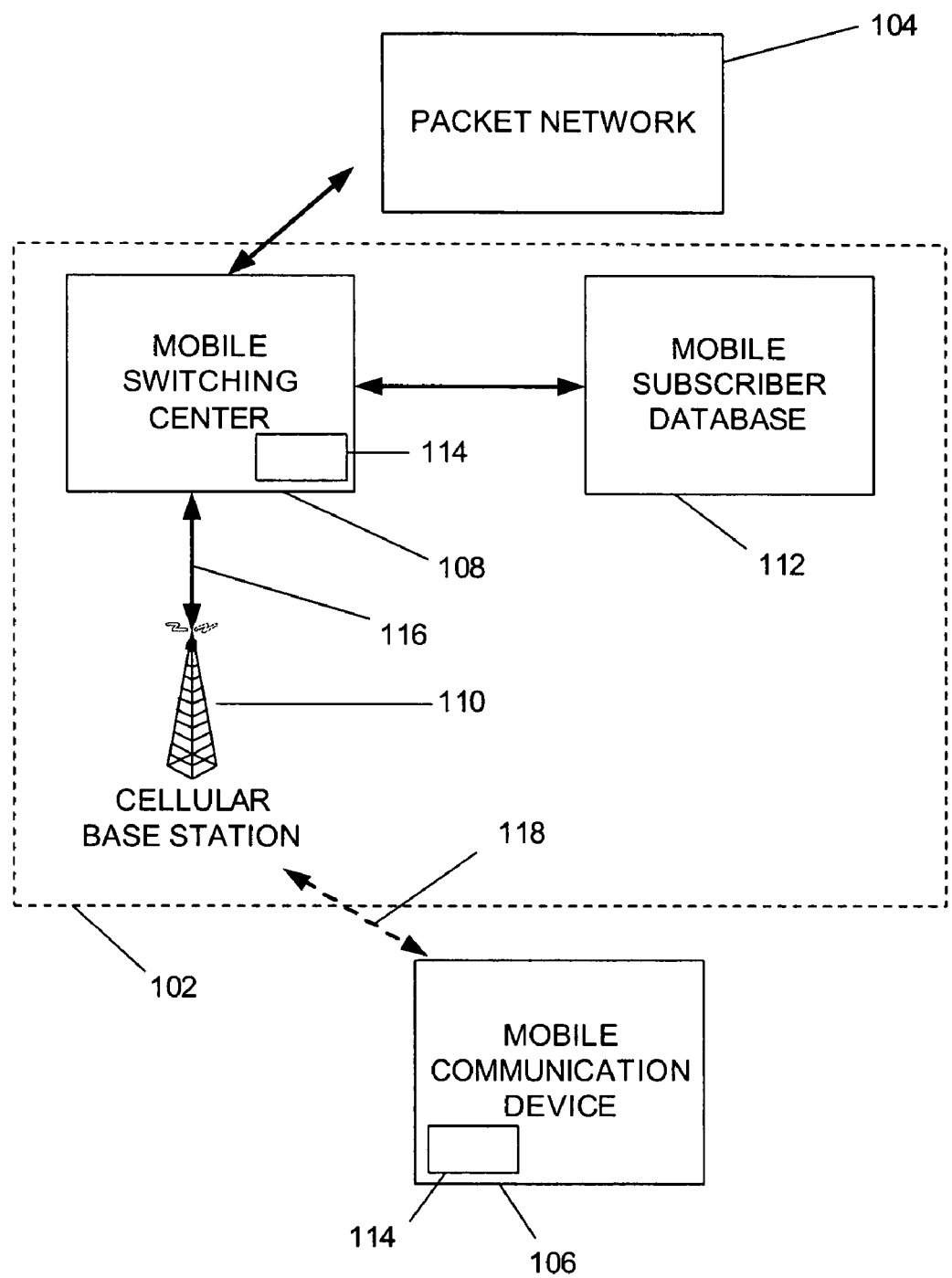
FIG. 1 is a representation of one implementation of an apparatus that comprises a cellular network, a packet network, and a mobile communication device.

Turning to FIG. 1, an apparatus 100 in one example comprises a cellular network 102, a packet network 104, and a mobile communication device 106. The cellular network 102 in one example comprises a mobile switching center 108, a cellular base station 110, and a mobiles subscriber database 112. The cellular network 102 provides a cellular service to a user of the mobile communication device 106. For example, the mobile switching center 108 and the cellular base station 110 cooperate to route calls and packet data transmissions to and/or from the mobile communication device 106. The mobile subscriber database 112 stores user preferences of the user of the mobile communication device 106. The mobile switching center 108 in one example comprises an instance of the recordable data storage medium 114, as described herein, as described herein.

The packet network 104 in one example comprises a packet switched network, for example, an internet protocol ("IP") packet switched network. The mobile switching center 108 routes packet data transmissions between the packet network 104 and the mobile communication device 106. The packet data transmissions in one example comprise file transfers and/or voice over IP ("VoIP") calls, as will be appreciated by those skilled in the art.

The mobile communication device 106 in one example comprises a mobile phone and/or personal digital assistant ("PDA"). The user of the mobile communication device 106 sends and/or receives packet data transmissions through employment of the mobile communication device 106. The user of the mobile communication device 106 in one example employs the mobile communication device to select one or more user preferences. The mobile communication device 106 in one example comprises an instance of the recordable data storage medium 114, as described herein.

The mobile switching center 108 routes packet data transmissions between the packet network 104 and the mobile communication device 106 through the cellular base station 110. The mobile switching center 108 comprises a communication link 116, for example, a packet pipe, with the cellular base station 110 for packet data transmissions. The cellular base station 110 comprises a communication link 118 to communicate with the mobile communication device 106. The mobile communication device 106 and the cellular base station 110 employ one or more radio frequencies and one or more Walsh codes to communicate over the communication link 118. The mobile communication device 106 employs communication channel elements, for example, fundamental channels and supplemental channels, to send and receive data transmissions. The packet pipes, radio frequencies, Walsh codes, and channel elements represent network resources of the cellular network 102. The cellular network 102 employs the network resources to handle the data transmissions to and/or from the mobile communication device 106, as will be appreciated by those skilled in the art.

Figure 2:
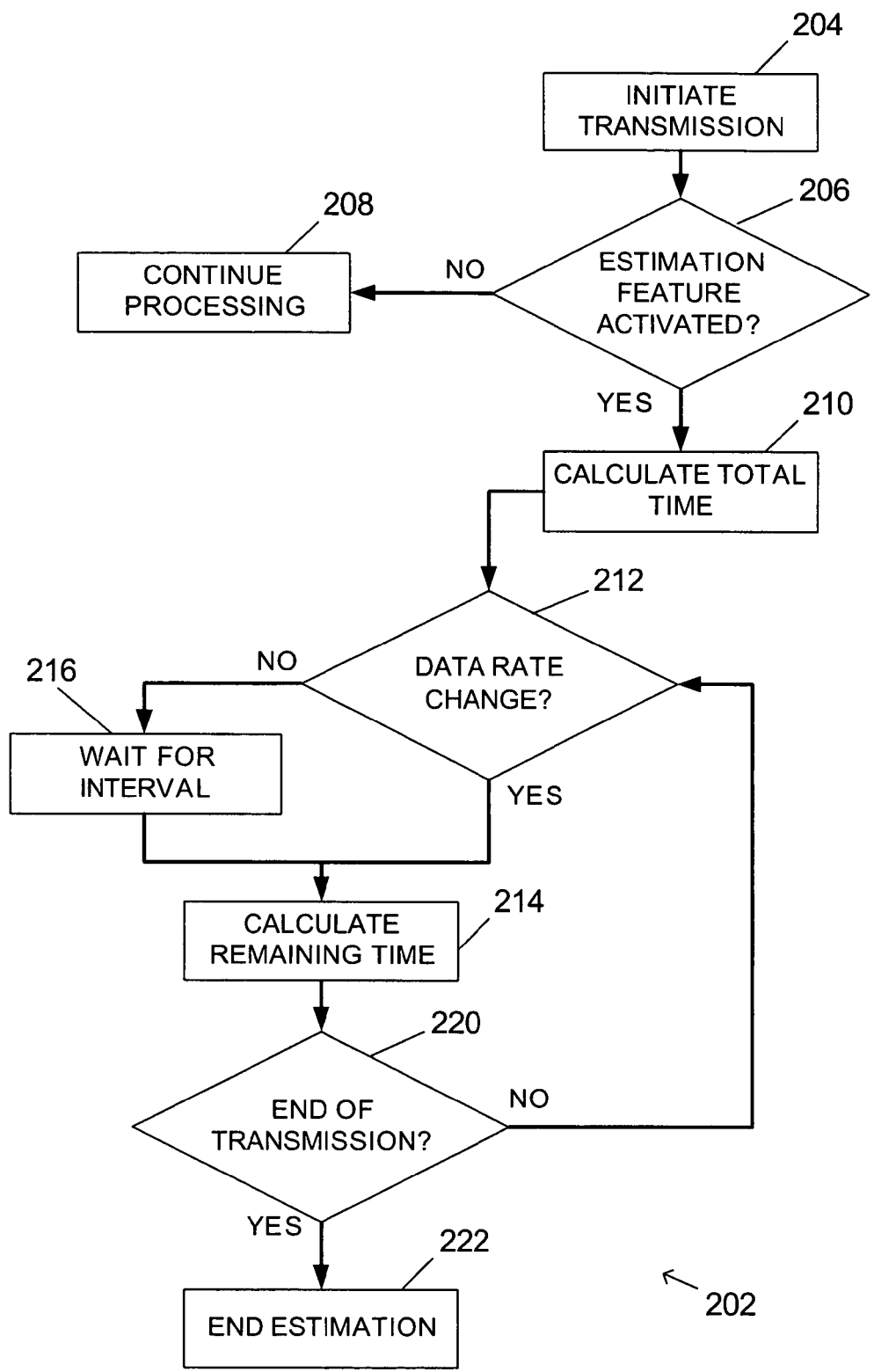
FIG. 2 is a representation of one implementation of a logic flow for a time period estimation by a mobile switching center of the cellular network of the apparatus of FIG. 1.

Turning to FIG. 2, the mobile switching center 108 employs a logic flow 202 for estimation of a time that remains for a data transmission of the mobile communication device 106. The user of the mobile communication device 106 employs the mobile communication device 106 to request a data transmission, for example, a transfer of a file from the packet network 104 to the mobile communication device 106. The mobile communication device 106 in one example employs the fundamental channel to request the data transmission from the mobile switching center 108. The mobile switching center 108 initiates (STEP 204) the data transmission. For example, the mobile switching center 108 allocates one or more supplemental channels for the data transmission.

The mobile switching center 108 determines an activation status of a time estimation feature for the data transmission (STEP 206). For example, the user employs the mobile communication device 106 to select a user preference to activate the time estimation feature. The mobile communication device 106 communicates the user preference to the mobile subscriber database 112. The mobile subscriber database 112 stores the user preference. If the mobile switching center 108 determines that the activation status of the time estimation feature comprises a disabled status, the mobile switching center 108 continues (STEP 208) a processing of the data transmission without the time estimation feature.

If the mobile switching center 108 determines that the time estimation feature is activated, the mobile switching center 108 makes an estimation (STEP 210) of a total time period for the data transmission. The estimation of the total time period in one example is based on a transmission size and/or the network resources. For example, where the transmission size is three hundred kilobytes ("KB") and the network resources allow a transfer rate of ten kilobytes per second, the total time period is approximately thirty seconds. An estimated time period that remains for the data session will change as the data transmission continues. For example, if after twenty seconds, the transfer rate has not changed, the estimated time that remains for the data transmission comprises ten seconds, as will be appreciated by those skilled in the art.

The mobile switching center 108 makes a determination (STEP 212) of a change in status of one or more of the network resources. For example, a data rate of the data transmission decreases due to an increase in subscriber traffic. Upon the change in status, the mobile switching center 108 estimates a time period that remains for the data transmission (STEP 214).

If the data rate does not change, the mobile switching center 108 waits for a time interval (STEP 216) before estimating the time period that remains for the data transmission. The data transmission in one example comprises a plurality of sub-sessions. The mobile switching center 108 estimates the time period upon a start of a sub-session of the data transmission. In a further example, the mobile switching center 108 estimates the time period upon a start of a non-initial sub-session, for example, sub-sessions created during the data transmission. In a still further example, the mobile switching center 108 estimates the time period upon a start of a plurality of the sub-sessions. The mobile switching center 108 in another example estimates the time period that remains upon an end of a time interval. The time interval in one example comprises a pre-determined time interval. For example, the time interval comprises a user preference, or is related to a quality of service level associated with the user. The mobile switching center 108 in one example estimates the time period that remains for the data transmission based on one or more current determinations of status of the network resources and one or more prior determinations of status of the network resources. For example, the mobile switching center 108 uses prior determinations of status to predict future determinations of status and employs the determinations to estimate the time period that remains for the data transmission, as will be appreciated by those skilled in the art.

Upon estimating the time period that remains for the data transmission, the mobile switching center 108 communicates the time period to the user of the mobile communication device 106. The mobile switching center 108 then determines if the data transmission has finished. If the data transmission has not finished, the mobile switching center 108 continues with the estimations at STEP 212. If the data transmission has finished, the mobile switching center 108 releases allocated resources for the data transmission and ends the estimation, as will be appreciated by those skilled in the art.

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example employs one or more computer-readable signal-bearing media. Examples of a computer-readable signal-bearing medium for the apparatus 100 comprise the recordable data storage medium 114 of the mobile communication device 106 and the recordable data storage medium 114 of the mobile switching center 108. For example, the computer-readable signal-bearing medium for the apparatus 100 comprises one or more of a magnetic, electrical, optical, biological, and atomic data storage medium. In one example, the computer-readable signal-bearing medium comprises a network comprising or coupled with the apparatus 100 for transmitting a modulate carrier signal, for instance, one or more of a telephone network, a local area network ("LAN"), the internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:
1. A method, comprising the steps of:
receiving, by a mobile switching center of a cellular network, a request for a transfer of a file to a mobile communication device, wherein the request is received over a fundamental channel from the mobile communication device;
initiating, by the mobile switching center, the transfer of the file from a packet network to the mobile communication device through the mobile switching center and a cellular base station of the cellular network;
making one or more determinations of status, for one or more packet network resources that handle the transfer of the file, during the transfer of the file, wherein the one or more packet network resources comprise one or more supplemental channels allocated for the transfer, wherein the transfer of the file is broken up into a plurality of sub-sessions over the one or more supplemental channels;
determining a time interval based on a quality of service level of a user of the mobile communication device;
estimating, at instances of the time interval during the transfer of the file, a time period that remains for the transfer of the file based on the one or more determinations of status;
wherein the step of making the one or more determinations of status comprises the step of:

determining a status for the one or more supplemental channels for the transfer of the file.

2. The method of claim 1, wherein the step of estimating the time period that remains comprises the step of:
estimating the time period that remains for the transfer of the file upon a start of a non-initial sub-session of the plurality of sub-sessions.

3. The method of claim 1, wherein the step of estimating the time period that remains upon the end of the time interval comprises the steps of:
retrieving a stored user preference of the user of the mobile communication device from a mobile subscriber database of the cellular network;
determining the time interval based on the stored user preference.

4. The method of claim 1, wherein the step of estimating the time period that remains comprises the step of:
estimating the time period that remains upon a change in the status for one or more of the one or more packet network resources that handle the transfer of the file.

5. The method of claim 1, wherein the one or more determinations of status comprise one or more current determinations of status, wherein the step of estimating the time period that remains comprises the step of:
estimating the time period that remains based on the one or more current determinations of status and one or more prior determinations of status for the one or more packet network resources.

6. The method of claim 1, wherein the step of making the one or more determinations of status comprises the step of:
determining a status for one or more of a radio frequency power for the transfer of the file, a Walsh code for the transfer of the file, and a packet pipe for the transfer of the file.

7. The method of claim 1, wherein the step of estimating the time period that remains comprises the steps of:
performing one or more estimations of time periods for the transfer of the file;
communicating one or more of the one or more estimations of the time periods to the user of the mobile communication device.

8. The method of claim 7, further comprising the step of:
determining an activation status of a time estimation feature for the user of the mobile communication device.

9. The method of claim 1, further comprising the steps of:
estimating a total time period for the transfer of the file based on a transmission size of the file.

10. The method of claim 9, wherein the step of estimating the time period that remains comprises the step of:
estimating the time period that remains based on the one or more determinations of status and a transmission size that remains for the transfer of the file.

11. An apparatus, comprising:
a mobile switching center of a cellular network that initiates a transfer of a file from a packet network, through the mobile switching center and a cellular base station of the cellular network, to a mobile communication device;
wherein the file is requested by a user of the mobile communication device over a fundamental channel;
wherein the mobile switching center makes one or more determinations of status for one or more packet network resources that handle the transfer of the file, during the transfer of the file;
wherein the one or more packet network resources comprise one or more supplemental channels allocated for the transfer;
wherein the one or more determinations of status comprise a determination of status for the one or more supplemental channels for the transfer of the file;
wherein the transfer of the file is broken up into a plurality of sub-sessions over the one or more supplemental channels;
wherein the mobile switching center determines a time interval based on a quality of service level of the user of the mobile communication device;
wherein the mobile switching center estimates a time period that remains for the transfer of the file based on the one or more determinations of status at instances of the time interval during the transfer of the file.

12. The apparatus of claim 11, wherein the mobile switching center estimates the time period that remains upon a change in the status for one or more of the one or more packet network resources.

13. An article, comprising:
one or more computer-readable signal-bearing media;
means in the one or more media for receiving, by a mobile switching center of a cellular network, a request for a transfer of a file to a mobile communication device, wherein the request is received over a fundamental channel from the mobile communication device;
means in the one or more media for initiating, by the mobile switching center, the transfer of the file from a packet network to the mobile communication device through the mobile switching center and a cellular base station of the cellular network;
means in the one or more media for making one or more determinations of status, for one or more packet network resources that handle the transfer of the file, during the transfer of the file, wherein the one or more packet network resources comprise one or more supplemental channels allocated for the transfer, wherein the transfer of the file is broken up into a plurality of sub-sessions over the one or more supplemental channels; and
means in the one or more media for determining a time interval based on a quality of service level of a user of the mobile communication device;
means in the one or more media for estimating, at instances of the time interval during the transfer of the file, a time period that remains for the transfer of the file based on the one or more determinations of status;
wherein the means in the one or more media for making the one or more determinations of status comprises:
means in the one or more media for determining a status for the one or more supplemental channels for the transfer of the file.

* * * * *